(12) United States Patent
von Krane et al.

(10) Patent No.: US 9,854,746 B2
(45) Date of Patent: Jan. 2, 2018

(54) BACKPACK POWER TOOL WITH A DRIVE MOTOR AND A BLOWER DRIVEN BY THE DRIVE MOTOR

(71) Applicant: Andreas Stihl AG & Co. KG, Waiblingen (DE)

(72) Inventors: Florian von Krane, Kirchberg (DE); Cornelius Gindele, Plochingen (DE); Christian Barth, Korb (DE); Kirsten Schellin, Schorndorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/496,281

(22) Filed: Apr. 25, 2017

(65) Prior Publication Data

US 2017/0311551 A1 Nov. 2, 2017

(30) Foreign Application Priority Data

Apr. 27, 2016 (DE) .......................... 10 2016 005 099

(51) Int. Cl.
| | |
|---|---|
| *A01G 1/12* | (2006.01) |
| *F04D 17/16* | (2006.01) |
| *F04D 25/08* | (2006.01) |
| *F04D 29/62* | (2006.01) |
| *F04D 29/42* | (2006.01) |
| *A47L 5/14* | (2006.01) |
| *A47L 5/36* | (2006.01) |

(52) U.S. Cl.
CPC .............. *A01G 1/125* (2013.01); *F04D 17/16* (2013.01); *F04D 25/082* (2013.01); *F04D 29/4226* (2013.01); *F04D 29/624* (2013.01); *A47L 5/14* (2013.01); *A47L 5/36* (2013.01)

(58) Field of Classification Search
CPC .. A01G 1/125; A01G 1/12; A47L 5/14; A47L 5/36; A47L 9/08; F04D 17/16; F04D 25/082; F04D 29/624; F04D 29/4226
USPC ................................................ 15/327.5, 405
See application file for complete search history.

(56) References Cited

U.S. PATENT DOCUMENTS

| | | | |
|---|---|---|---|
| 7,774,896 B2 * | 8/2010 | Andresen ............... | A01G 1/125 15/326 |
| 9,004,854 B2 * | 4/2015 | Nakazawa ............ | F04D 29/664 15/326 |

(Continued)

FOREIGN PATENT DOCUMENTS

| | | |
|---|---|---|
| EP | 2 684 446 | 1/2014 |
| JP | 2008-063779 | 3/2008 |

*Primary Examiner* — David Redding
(74) *Attorney, Agent, or Firm* — Gudrun E. Huckett

(57) ABSTRACT

A backpack power tool has drive motor and blower mounted on a backpack frame. The bottom plate of the backpack frame has a passage for working air sucked in by the blower. Ribs on the bottom side of the bottom plate have end faces forming a contact surface for leaves aspirated in blower operation against the bottom plate. The bottom plate has intake openings positioned between the end faces of the ribs in the contact surface and fluidically connected to the passage. Working air is sucked in through the intake openings and the passage. The bottom plate has an intake surface that is the sum of surfaces of all intake openings and of all end faces of ribs with a width of less than 10 mm positioned between the intake openings. The intake surface amounts to at least 50% of the surface of the bottom side of the bottom plate.

21 Claims, 8 Drawing Sheets

(56) References Cited

U.S. PATENT DOCUMENTS

| | | | |
|---|---|---|---|
| 9,206,567 B2* | 12/2015 | Kinoshita | A01G 1/125 |
| 2001/0002501 A1 | 6/2001 | Doragrip | |
| 2005/0205750 A1* | 9/2005 | Hafendorfer | A01G 1/125 |
| | | | 248/637 |
| 2006/0162116 A1* | 7/2006 | Andresen | A01G 1/125 |
| | | | 15/330 |
| 2007/0294855 A1* | 12/2007 | Iida | A01G 1/125 |
| | | | 15/327.5 |
| 2015/0282435 A1* | 10/2015 | Mutoh | A01G 1/125 |
| | | | 15/405 |
| 2016/0095280 A1* | 4/2016 | Mutoh | A01G 1/125 |
| | | | 15/327.2 |

* cited by examiner

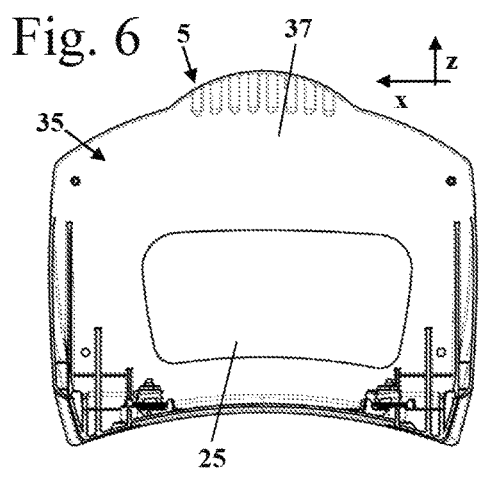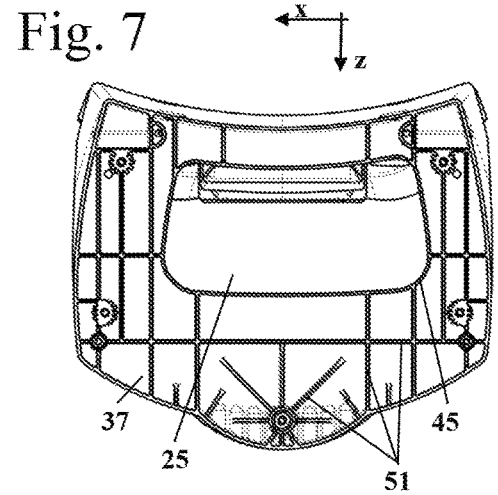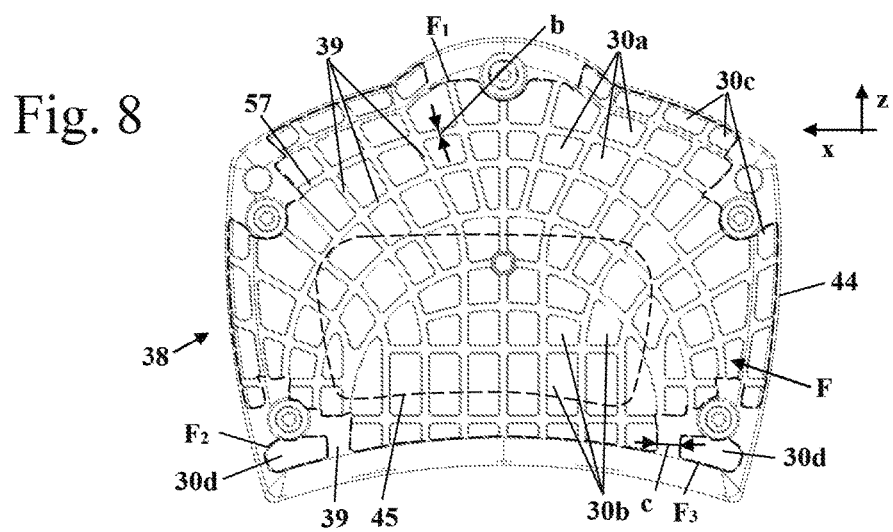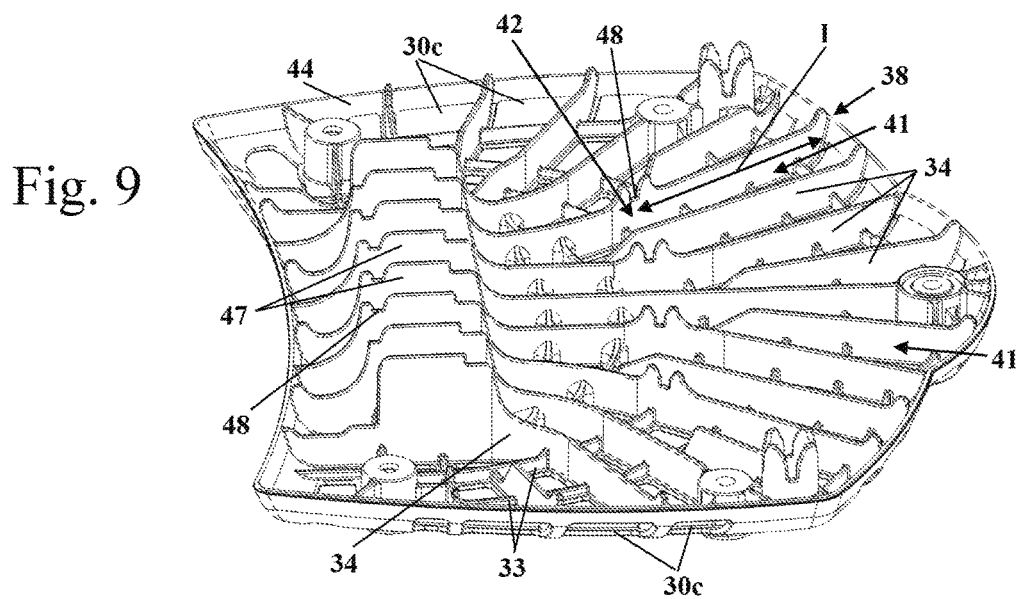

BACKPACK POWER TOOL WITH A DRIVE MOTOR AND A BLOWER DRIVEN BY THE DRIVE MOTOR

BACKGROUND OF THE INVENTION

The invention relates to a backpack power tool with a drive motor and a blower driven by the drive motor.

JP 2008-063779 A discloses a backpack power tool, i.e., a backpack blower apparatus. On the backpack frame of the blower apparatus, a blower as well as a drive motor for driving the blower are fastened. The working air is sucked in through a passage in the bottom plate of the backpack frame. Ribs are provided at the passage that prevent leaves from being sucked into the blower.

It has been found that such a passage at the bottom side of the bottom plate may become clogged in operation, for example, by aspirated leaves. A sufficient supply of the power tool with working air is then no longer provided.

It is an object of the invention to provide a backpack power tool that ensures a sufficient supply of working air.

SUMMARY OF THE INVENTION

This object is solved by a backpack power tool comprising a drive motor and a blower driven by the drive motor and conveying a working air flow; further comprising a backpack frame that comprises a back plate and a bottom plate, wherein the bottom plate has a top side facing the blower and the drive motor and a bottom side facing away from the blower and the drive motor, wherein the bottom plate comprises at least one passage through which the working air can be sucked in by the blower from the bottom side through the bottom plate to the top side of the bottom plate, wherein on the bottom side of the bottom plate ribs are extending whose end faces which are facing away from the top side provide a contact surface for aspirated leaves, wherein on the bottom side of the bottom plate at least one intake opening is arranged by means of which the blower sucks in the working air flow from the environment through the at least one passage, wherein the at least one intake opening is positioned between the end faces of the ribs in the contact surface and is connected by at least one flow connection positioned on the side of the contact surface that is facing the blower with the at least one passage, wherein the power tool has an intake surface that is the sum of the surfaces of all intake openings and all end faces of ribs extending between the intake openings and having a width of less than 10 mm, and wherein the intake surface amounts to at least 50% of the surface of the bottom side of the bottom plate.

The invention provides that on the bottom side of the bottom plate at least one intake opening is formed by means of which the blower sucks in the working air flow from the environment through the bottom plate via the at least one passage. In order to prevent that the at least one passage can become clogged or closed off by aspirated leaves or the like, it is provided that on the bottom side of the bottom plate ribs are arranged whose end faces that are facing away from the top side form a contact surface for aspirated leaves. The at least one intake opening is positioned between the end faces of the ribs in the contact surface. The at least one intake opening is connected to the at least one passage by at least one flow connection that is positioned on the side of the contact surface which is facing the blower. The intake openings form an intake surface. In order to substantially prevent clogging of the intake opening with aspirated leaves or the like, it is provided that the intake surface amounts to at least 50% of the surface of the bottom side of the bottom plate.

The passage is an opening in the bottom plate that enables flow between bottom side and top side of the bottom plate through the bottom plate. The at least one passage is realized by a cutout, i.e., a reduction of material, in the bottom plate. The contact surface is the geometric surface that is defined by the end faces of the ribs. In this context, the contact surface must not be a planar surface but can be embodied, in sections thereof, in an arc shape or with steps, depending on the arrangement of the ribs.

When a plurality of intake openings are provided, these intake openings are advantageously interrupted by the end face of at least one rib. It has been found that ribs with a width of up to 10 mm impair the sucking action only insignificantly. These ribs are therefore taken into account for determining the size of the intake surface. The intake surface is the sum of the surface area of all intake openings plus the surface of the end faces of the ribs extending between the intake openings and having a width of less than 10 mm. Ribs with a width of more than 10 mm are not added to the intake surface. In this context, those openings are considered as intake openings that are located in the contact surface and that are connected with the at least one passage by at least one flow connection positioned on the side of the contact surface which is facing the blower. In this context, the intake openings open advantageously into an area between the ribs of the bottom plate. In case of openings that are only partially located within the contact surface, only the area that is positioned within the contact surface is considered as an intake opening. Those openings that are arranged outside of the contact surface or that are not connected with the at least one passage by a flow connection positioned on the side of the contact surface facing the blower do not constitute intake openings in the meaning of the present invention.

Since the intake surface is very large, the suction created at an individual intake opening is minimal and clogging of the intake surface by leaves or the like can be substantially avoided. Since each intake opening of the intake surface is connected with the at least one passage by a flow connection which is positioned on the side of the contact surface which is facing the blower, working air can be sucked in and conveyed to the passage even for a partially closed intake surface by means of the remaining open intake openings. In this context, the flow connection is arranged with its entire length on the side of the contact surface which is facing the blower. Due to the intake surface which is enlarged relative to known blower apparatus, the aspirated leaves or the like can easily fall off again because no sufficient vacuum is generated to hold the leaves at the intake surface at a minimal power output of the drive motor, for example, when idling. The position of the intake surface at the bottom side of the bottom plate is beneficial with respect to the action of gravity causing the leaves to fall off the bottom plate again.

The proportion of the sum of the surfaces of the intake openings at the intake surface advantageously amounts to at least one third, in particular at least half, of the intake surface. The sum of the surfaces of the end faces of ribs that are taken into consideration for the calculation of the intake surface advantageously amounts to less than two thirds, in particular less than half, of the intake surface. In this context, the end faces of the ribs which are to be taken into consideration for the calculation of the intake surface are end faces which have a width of less than 10 mm and are positioned between the intake openings.

The ratio of the intake surface to the sum of the cross section surfaces of all passages advantageously amounts to from 1 to 5. The intake surface in this context advantageously amounts to at least one third of the surface of the bottom side of the bottom plate. For a ratio of the intake surface to the sum of the cross section surfaces of all passages of 1, all intake openings advantageously have a direct connection to the top side of the bottom plate. The passages in this context advantageously can completely overlap the intake openings. In case of a ratio of 5, the intake surface is significantly greater than the sum of the cross section surfaces of all passages. This is in particular the case for a very large intake surface and a comparatively small cross section surface of the passages. In particular, only one passage is provided in this case.

Preferably, the intake surface amounts to 70% to 100% of the surface of the bottom side of the bottom plate. The intake surface can be selected to be very large because the intake openings can utilize the space between existing reinforcement structures, i.e., ribs at the bottom side of the bottom plate, so that no weakening of the bottom plate by material reduction must occur. With the exception of the ribs that are required for sufficient stability of the contact surface, the intake surface extends substantially completely across the bottom side of the bottom plate. In this context, the bottom side of the bottom plate is the side that is visible from below in a plan view of the bottom plate. The surface of the bottom side refers to the surface area which results from a perpendicular projection of the bottom side onto a planar horizontal support surface. The flow cross section of the at least one passage is advantageously significantly smaller than the intake surface. In this way, a sufficiently high stability of the bottom plate can be achieved. The sum of the cross section surfaces of all passages advantageously amounts to 20% to 80% of the surface of the bottom side of the bottom plate. Preferably, the sum of the cross section surfaces of all passages amounts to 25% to 70% of the surface of the bottom side of the bottom plate.

Advantageously, one passage is a main passage. The main passage is the passage through which the greatest proportion of working air is sucked in from the bottom side to the top side of the bottom plate. When only one passage exists, this passage is the main passage because through this passage the entire working air is sucked from the bottom side to the top side of the bottom plate. When a plurality of passages are provided in the bottom plate, the main passage is the passage through which the greatest proportion of working air is flowing. The main passage is therefore preferably the passage with the greatest free flow cross section. The main passages is in particular the greatest cutout of the bottom plate that forms a passage wherein the cross section of the passage corresponds to the cross section of the cutout. A grate or screen covering a passage is advantageously not taken into consideration when determining the cross section of the main passage. The intake surface is advantageously at least twice as large as the cross section of the main passage. The intake surface is therefore significantly greater than the cross section of the main passage. Preferably, the intake surface is at least 2.5 times as large as the cross section of the main passage.

The blower comprises a blower spiral into which the working air flow is conveyed. The blower spiral is advantageously projecting into the main passage. The main passage is therefore the passage into which the blower spiral is extending partially. The blower spiral reduces thus the free flow cross section of the main passage.

The blower comprises an inlet that is facing the back plate. Between the back plate and the inlet, an intermediate space is advantageously formed. The working air which is sucked in through the main passage exits from the main passage to enter advantageously immediately the intermediate space between the back plate and the inlet. The intermediate space thus adjoins the main passage. The main passage is advantageously arranged closer to the back plate than to the side of the bottom plate which is facing away from the back plate.

For sucking in working air, advantageously at least one channel is formed on the bottom side of the bottom plate. The channel is preferably completely or partially open relative to the bottom side. The channel is at least partially delimited by the ribs. On the side of the channel which is facing the bottom side of the bottom plate, at least one intake opening is arranged. The intake opening opens in this context advantageously in such a way into the channel that the working air which is entering through the intake opening is sucked through the channel to the main passage. Advantageously, the channel is positioned immediately adjacent to the bottom side of the bottom plate and a plurality of intake openings open into the longitudinal side of the channel arranged at the bottom side.

In case of a channel which is completely open toward the bottom side, the longitudinal side of the channel which is positioned in the contact surface forms the intake opening. The channel extends advantageously in the direction toward the main passage. The length of the side of the channel which is facing the bottom side advantageously amounts to at least 5 cm. Preferably, the length at the side of the channel which is extending at the bottom side of the bottom plate amount to at least 8 cm. Leaves or like materials that are aspirated are usually smaller and cannot clog completely the longitudinal side of the channel extending at the bottom side of the bottom plate. Accordingly, despite the material adhering to the bottom side of the bottom plate, working air can be conveyed to the main passage through the channel.

The channel has advantageously a width of at least 10 mm, in particular at least 20 mm. In this way, it can be avoided that leaves or the like can be sucked into the channel. In order to prevent that the aspirated leaves curve into the channel and substantially close off the channel, it is advantageously provided that the channel has a depth of at least 5 mm, in particular at least 10 mm.

The channel comprises advantageously at least one mouth by means of which the channel is connected to the main passage. In this context, the flow cross section of the mouth advantageously amounts to at most 50% of the surface of the intake openings arranged at this channel. The flow cross section of the mouth is therefore significantly smaller than the surface of the intake openings. The mouth is preferably arranged at a circumferential wall of the main passage. The working air which is sucked in through the channel therefore enters the main passage through the mouth in the circumferential wall. However, it can also be provided that the mouth is arranged at the top side of the bottom plate and is connected fluidically with the passage at the top side of the bottom plate.

Alternatively or additionally, a mouth can also be provided that is arranged below, i.e., on the side of the circumferential wall of the main passage which is facing the bottom side.

The power tool comprises advantageously a parking position in which the power tool is parked on a planar horizontal support surface. Advantageously, the power tool is supported with the bottom plate, in particular with legs arranged on the bottom plate, on the support surface. In the parking position, at least one intake opening is advantageously positioned at least partially outside of the passage when viewed in a perpendicular projection onto the support surface. The at least one intake opening is positioned advantageously at least partially outside of the main passage. Relative to the position of the power tool in the parking position, the working air is therefore not sucked in exclusively in a vertical direction from below but also from areas which are positioned laterally outside of the main passage so that multiple deflections of the working air flow are required.

Since at least one intake opening is located at least partially outside of the correlated passage, a large intake surface can be formed in a simple way. The intake surface is preferably embodied close to the support surface. Leaves or the like are therefore not aspirated against the bottom plate but are caught near the bottom side of the bottom plate. Advantageously, the spacing of the contact surface relative to the support surface in the parking position amounts to less than 20 mm at every location of the contact surface. Preferably, the spacing is less than 10 mm. The spacing between contact surface and support surface is measured in this context perpendicular to the support surface at the location that has the greatest spacing between contact surface and support surface.

Advantageously, the drive motor is an internal combustion engine. A portion of the air flow which is sucked in through the contact surface is advantageously branched off as a cooling air flow for cooling the internal combustion engine. In this way, no additional blower for conveying cooling air for the internal combustion engine is required. Due to the large intake surface, a sufficient cooling action of the internal combustion engine can be ensured in a simple way. The cooling air flow for cooling the internal combustion engine is advantageously branched off the blower spiral.

The power tool comprises advantageously an operating medium tank which in the parking position is arranged above the bottom plate and on the side of the blower which is facing away from the back plate. Advantageously, one passage is an auxiliary passage. In this context, an auxiliary passage is a passage that does not suck in the greatest proportion of the working air through the bottom plate. Advantageously, at least one auxiliary passage is arranged in the area which is arranged below the operating medium tank in the parking position. In this way, working air can also pass through the bottom plate into the area below the operating medium tank. Advantageously, the operating medium tank has a shape which allows for passing of the flow of the sucked-in working air between bottom plate and operating medium tank. Preferably, a plurality of auxiliary passages are provided below the operating medium tank.

In order to enable also intake of working air at the circumference of the bottom plate, it is advantageously provided that at least one intake opening is extending up to a circumferential wall of the bottom plate.

Advantageously, the internal combustion engine is arranged in a motor housing which is arranged in the parking position above the operating medium tank. The motor housing forms in this context a portion of the power tool housing of the power tool. Between the motor housing and the operating medium tank advantageously at least one gap for sucking in working air is formed. The power tool comprises in the area between the blower and the backpack frame at least one opening that sucks in working air and opens into the intermediate space. The at least one opening is an upper opening through which the working air is sucked in from above the bottom plate. The area between blower and backpack frame where the at least one upper opening is arranged adjoins advantageously the periphery of the back plate.

Since openings for sucking in working air are provided in various areas of the power tool, a great surface for sucking in working air from the environment can be made available as a whole so that the risk of clogging of the entire surface by leaves or the like is reduced. When the at least one upper opening is clogged, for example, by falling leaves, a sufficient cooling action of the drive motor by means of the at least one intake opening at the bottom side of the bottom plate is ensured.

BRIEF DESCRIPTION OF THE DRAWING

FIG. 6 is a view of the bottom plate from the side which is facing the drive motor.

FIG. 7 is a view of the top part of the bottom plate from the side which is facing away from the drive motor.

FIG. 8 is a view of the bottom part of the bottom plate showing the side which is facing away from the drive motor.

FIG. 9 is a perspective illustration of the bottom part of the bottom plate showing the side which is facing the drive motor.

DESCRIPTION OF THE PREFERRED EMBODIMENTS

Figure 1:
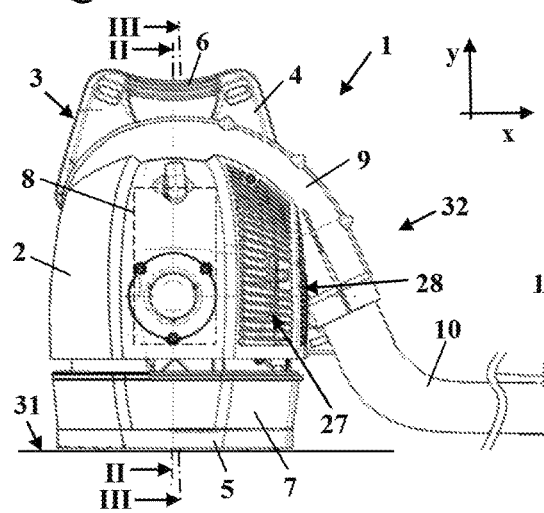
FIG. 1 is a schematic side view of a backpack blower apparatus.
Figure 2:
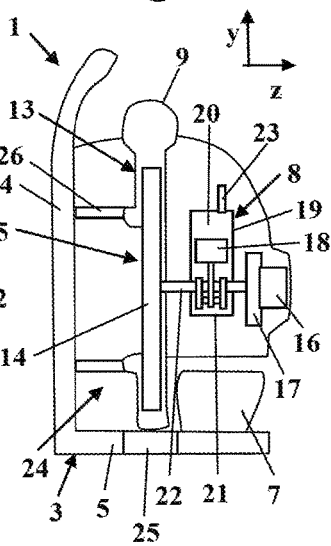
FIG. 2 shows a schematic section illustration along the section line II-II of FIG. 1.

FIG. 1 shows a blower apparatus 1 as an example of a backpack power tool. The configuration of the blower apparatus 1 is schematically shown in FIGS. 1 and 2. The blower apparatus 1 comprises a backpack frame 3 on which a power tool housing 2 is fastened. The backpack frame 3 comprises a back plate 4 which in usual operation, i.e., when the operator carries the backpack frame 3 like a backpack on his shoulders, is extending approximately vertically. The backpack frame 3 comprises furthermore a bottom plate 5 which in usual operation is arranged approximately horizontally. In FIG. 1, the blower apparatus 1 is shown in a parking position 32 in which the blower apparatus 1 is parked on a flat horizontal support surface 31. In this position, the bottom plate 5 is arranged neighboring the support surface 31. On the side of the back plate 4 which is at the top in the parking position 32, a carrying handle 6 is provided which is formed integrally with the back plate 4 in the embodiment. An operating medium tanks 7 is mounted on the bottom plate 5.

In the power tool housing 2, a drive motor 8 is arranged which is embodied as an internal combustion engine in the embodiment. The blower apparatus 1 comprises a blower spiral 9 through which a working air flow is conveyed by the drive motor 8. A blower tube 10 adjoins the blower spiral 9. On the blower tube 10 a handle 11 is arranged with which the operator can guide the blower tube 10. Operating elements 12, i.e., a throttle trigger, a throttle trigger lock as well as a stop switch, are arranged on the handle 11. Additional or other operating elements 12 can also be provided. In FIG. 1, a coordinate system is shown for simplifying the description. The x axis extends in the parking position 32 horizontally and parallel to the bottom plate 5 in the embodiment. The y axis extends in the parking position 32 vertically and upwardly. The back plate 4 extends approximately in the direction of the y axis. In order to provide a high carrying comfort, the back plate 4 is advantageously designed as a curved freeform surface. As also shown in FIG. 1, the power tool housing 2 has front outflow openings 27 as well as lateral outflow openings 28 whose function will be explained in the following in more detail. The front outflow openings 27 are arranged on the side of the power tool housing 2 facing away from the back plate 4.

FIG. 2 shows schematically the configuration of the drive unit of the blower apparatus 1. A blower 13 is secured by fastening elements 26 on the backpack frame 3. In the embodiment, the blower 13 is fastened to the back plate 4 of the backpack frame 3. The fastening elements 26 are advantageously anti-vibration elements that effect vibration decoupling of the blower 13 from the backpack frame 3. FIG. 2 shows the blower apparatus 1 in a section illustration in which the y axis is oriented vertically and the z axis is oriented from the backpack frame 3 in the direction toward the drive motor 8. The z axis extends parallel to the support surface 31 (FIG. 1).

The blower 13 comprises a blower wheel 14 which is arranged in the blower spiral 9. The blower wheel 14 is driven in rotation about axis of rotation 52 and is designed as a radially acting blower wheel. The blower wheel 14 sucks in working air through an inlet 15 which is arranged at an end face of the blower wheel 14 and conveys the working air into the blower spiral 9 and from there into the blower tube 10 (FIG. 1).

In FIG. 2, the drive motor 8 is also schematically shown. The drive motor 8 is advantageously a one-cylinder motor, in particular a two-stroke motor or a mixture-lubricated four-stroke motor. The drive motor 8 comprises a cylinder 19 in which a combustion chamber 20 is formed. The spark plug 23 projects into the combustion chamber 20. A piston 18 is reciprocatingly driven in the cylinder 19 and drives a crankshaft 22 which is rotatably supported about axis of rotation 52 in the crankcase 21. The blower wheel 14 is fixedly connected to the crankshaft 22. On the side of the drive motor 8 which is opposite the blower wheel 14, a flywheel 17 is secured on the crankshaft 22. The drive motor 8 comprises a starter device 16, advantageously a pull starter or an electric starter. The starter device 16 interacts with the flywheel 17 and drives the flywheel 17 and thus the crankshaft 22 in rotation when starting the drive motor 8. The drive motor 8 is arranged in a motor housing 43 that forms a part of the power tool housing 2. In the embodiment, below the motor housing 43 an operating medium tank 7 is arranged. A different arrangement of the operating medium tank 7 can be advantageous also.

As also shown in FIG. 2, between the blower spiral 9 and the backpack frame 3 an intermediate space 24 is formed. In the embodiment, the intermediate space 24 is formed between the blower spiral 9 and back plate 4 of the backpack frame 3. An inlet 15 (see also FIG. 3) is branching off the intermediate space 24. In the bottom plate 5 a passage is arranged which is formed as a main passage 25 and through which the working air is sucked into the intermediate space 24 from a bottom side 36 of the bottom plate 5. The bottom side 36 of the bottom plate 5 is the side of the bottom plate which is facing away from the blower 13 and the drive motor 8. In the parking position 32, the bottom side 36 is facing the support surface 31.

Figure 3:
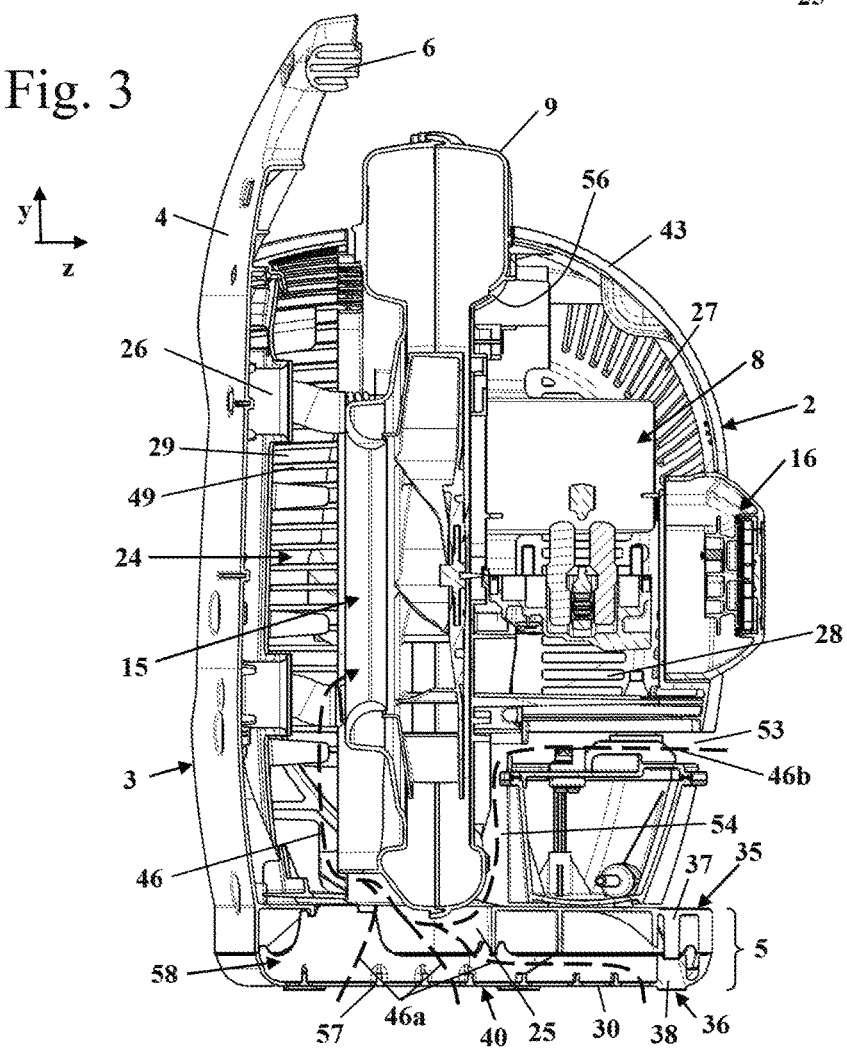
FIG. 3 is a schematic section illustration along the section line III-III of FIG. 1.

As shown in FIG. 3, the blower spiral 9 is projecting in the embodiment partially into the main passage 25. An arrangement of the blower spiral 9 in which the blower spiral 9 does not project into the main passage 25 can be advantageous also. The working air is sucked into the inlet 15 of the blower 13 as illustrated by arrows 46 shown in dashed lines. In this context, a partial air flow 46a is sucked from the bottom side 36 of the bottom plate 5 through the main passage 25 into the intermediate space 24. A further partial air flow 46b is sucked in through a gap 53 formed between the motor housing 43 and the operating medium tank 7 and through a gap 54 formed between the operating medium tank 7 and the blower spiral 9 so as to pass below the blower spiral 9 into the intermediate space 24. In doing so, the partial air flow 46b can also partially or completely enter the main passage 25.

As also shown in FIG. 3, between the back plate 4 and the blower spiral 9, upper openings 29 are formed on the power tool housing 2 through which the working air can be sucked into the intermediate space 24. Through the upper openings 29, working air is sucked in from an area which is above the bottom plate 5 in the parking position 32 and thus also in the usual operating position. The openings 29 are formed on a cover grate 49 which extends between the blower spiral 9 and the back plate 4 and forms part of the power tool housing 2.

The bottom plate 5 is comprised in the embodiment of a top part 37 that is formed as one piece together with the back plate 4 as well as a separate bottom part 38 secured on the top part 37. The bottom plate 5 has a top side 35 which is facing the drive motor 8 and the blower 13 and which is formed on the top part 37. The bottom plate 5 also comprises the bottom side 36 which is facing away from the drive motor 8 and the blower 13. In the embodiment, the bottom side 36 is formed on the bottom part 38. On the bottom side 36, intake openings 30 are provided through which the partial air flow 46a is sucked into the main passage 25. The intake openings 30 are formed as openings in a grate 57 at the bottom side 36 of the bottom plate 5. The grate 57 forms a contact surface 40 for leaves or the like which prevents that leaves can enter the passage 25. The grate 57 delimits an intake chamber 58 which is formed in the bottom plate 5 and is connected via the main passage 25 with the intermediate space 24.

In the embodiment, the drive motor 8 is cooled by cooling air which is branched off the blower spiral 9. For this purpose, the blower spiral 9 comprises at the side which is facing the drive motor 8 a cooling air opening 56 which is embodied in the embodiment as a narrow slot. The cooling air passes through the cooling air opening 56 into the motor housing 43. The motor housing 43 is that part of the power tool housing 2 in which the drive motor 8 is arranged. The cooling air cools the drive motor 8 and flows through the outflow openings 27 and 28 out of the motor housing 43.

Figure 4:
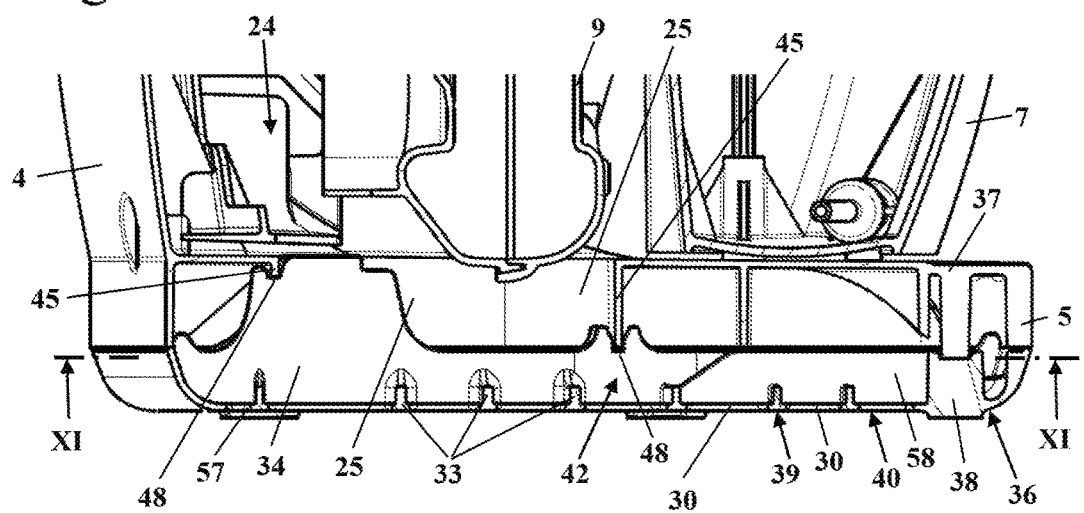
FIG. 4 is an enlarged detail view of FIG. 3 showing the area of the bottom plate.
Figure 5:
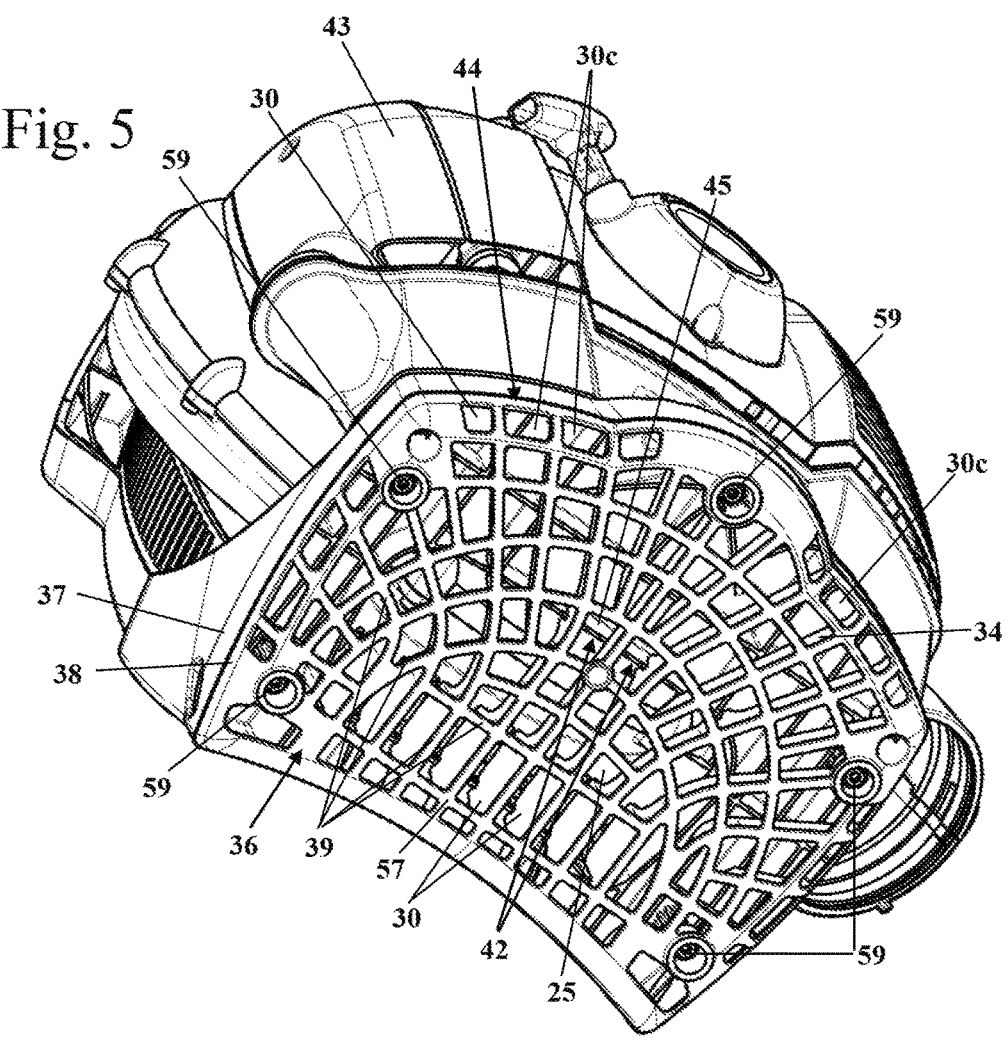
FIG. 5 is a perspective illustration of the blower apparatus in a view from below.

FIGS. 4 and 5 show the configuration of the grate 57 in detail. As shown in FIG. 4, the bottom part 38 has ribs. The ribs are designed as transverse ribs 33 as well as guide ribs 34. The transverse ribs 33 extend approximately transverse to the guide ribs 34. In the embodiment, the transverse ribs 33 have a significantly reduced height compared to the guide ribs 34. The transverse ribs 33 and the guide ribs 34 comprise end faces 39 which are positioned at the bottom side 36. The end faces 39 are the end faces of the ribs 33 and 34 which are facing away from the blower 13 and the drive motor 8 (FIG. 3). The end faces 39 form the grate 57. This is also shown in FIG. 5. Between the ribs 33 and 34, the intake openings 30 are formed through which the working air is sucked into the intake chamber 58 and from there into the main passage 25.

The main passage 25 is positioned advantageously centrally in the bottom plate 5. In this context, the main passage 25 is arranged off-center, in particular in at least one direction. Advantageously, the main passage 25 is arranged in the z direction as well as in the x direction off-center. In the embodiment according to FIG. 4, there is only one single passage provided that extends through the bottom plate 5.

However, it can also be provided that, in addition to the main passage 25, further passages are provided in the bottom plate 5. The main passage 25 is delimited at its circumference by a circumferential wall 44. The circumferential wall 44 projects into recesses 48 of the guide ribs 34 and secures in this way the position of the bottom part 38 on the top part 37 of the bottom plate 5. As also shown in FIG. 4, the transverse ribs 33 have an approximately T-shaped cross section. A T-shaped cross section may also be advantageous for the guide ribs 34.

The contact surface 40 in the embodiment is formed by the end faces 39 of the ribs 33 and 34. The intake openings 30 are also positioned in the contact surface 40. The intake chamber 58 is positioned completely on the side of the contact surface 40 which is facing the blower 13. In this way, from each one of the intake openings 30 a flow connection to the main passage 25 is provided which is extending on the side of the contact surface 40 facing the blower 13. As long as the contact surface 40 at least partially is free of leaves or the like, working air can be sucked into the intake chamber 58 and from there into the main passage 25 and into the intermediate space 24. In the embodiment, the contact surface 40 is comprised of a planar surface and a curved rim surface adjoining the rim of the planar surface. The contact surface comprises in the embodiment an approximately dish-shaped configuration and extends with the bottom part 38 to a location close to the top part 37. Depending on the configuration of the transverse ribs 33 and of the guide ribs 34, the contact surface 40 can however have a substantially arbitrary configuration.

FIG. 5 shows that the intake openings 30 extend across most of the bottom side 36 of the bottom plate 5. The bottom side 36 is the side of the bottom plate 5 which is visible in a view in y direction, i.e., in the parking position 32 viewed perpendicularly relative to the support surface 31 in upward direction. FIG. 5 shows the bottom part 38 fixed by fastening screws 59 to the top part 37. In this way, retrofitting of the bottom part 38 on existing blower apparatus 1 is possible in a simple way. The bottom plate 5 comprises intake openings 30c that extend into the area of the circumferential wall 44. The circumferential wall 44 extends in the embodiment in a curved shape and comprises the curved part of the contact surface 40 in which the intake openings 30c are positioned at least partially. Intake into the intake chamber 58 is possible through the intake openings 30c laterally, i.e., in the x-z plane.

FIGS. 6 and 7 show the top part 37 of the bottom plate 5. As shown in FIG. 6, on the top side 35 of the bottom plate 5 only the main passage 25 is arranged. Further passages are not provided. Therefore, no additional flow connections in the bottom plate 5 between top side 35 and bottom side 36 of the bottom plate 5 are existing. The main passage 25 is arranged in the area of the blower spiral 9 (FIGS. 3 and 4). No passages are provided in the top part 37 in the area of the operating medium tank 7 (FIG. 4).

FIG. 7 shows the top part 37 in a view from below, i.e., from the side which is facing the support surface 31 in the parking position 32. As shown in FIG. 7, reinforcement ribs 51 are provided on this side of the top part 37. The reinforcement ribs 51 have across their length and among each other approximately the same height. In the parking position 32 (FIG. 1), the reinforcement ribs 51 end above the bottom edge of the circumferential wall 45 of the main passage 25 or at the same level with the bottom edge of the circumferential wall 45 of the main passage 25. In the parking position 32, the dead spaces which are enclosed by the reinforcement ribs 51 are farther removed from the support surface 31 than the bottom edge of the circumferential wall 45 of the main passage 25. In none of the section planes that intersects the reinforcement ribs 51 and is defined by the x direction and the z direction, a flow connection between one of the dead spaces enclosed by the reinforcement ribs 51 and the main passage 25 is existing. When leaves or the like adhere to the reinforcement ribs 51 in a blower apparatus that has no bottom part 38, the working air cannot flow through the spaces formed between the reinforcement ribs 51 into the main passage 25 because the circumferential wall 45 of the main passage 25 blocks the flow passage.

FIG. 8 shows the position of the intake openings 30 on the bottom part 38 of the bottom plate 5. The intake openings 30 include first intake openings 30a which, in the illustrated view, are positioned in y direction outside of the circumferential wall 45 of the main passage 25. The intake openings 30 include also second intake openings 30b which are positioned in the projection of the circumferential wall 45, i.e., are positioned in overlap with the main passage 25. Also, third intake openings 30c are provided which border the circumferential wall 44 of the bottom plate 5. The end faces 39 of the ribs extending between the intake openings 30a, 30b, and 30c have a width b which is less than 10 mm. In this context, the width b can be different or can change across the length of an end face 39. The intake openings 30 include also intake openings 30d which, in the embodiment, are arranged near the back plate 4 (FIG. 5) and which are separated from the intake openings 30a by end faces 39 whose width c is greater than 10 mm.

As shown in FIG. 8, the intake openings 30 extend across most of the surface of the bottom side 36 of the bottom plate 5. The sum of the surface areas of all intake openings 30a, 30b, 30c, and 30d, i.e., of all openings at the bottom side 36 which are connected by means of flow connections above the contact surface 40 with the main passage 25, form an intake surface F. Also, end faces 39 with a width b of less than 10 mm are included in the intake surface F. The intake surface F thus refers to a free flow cross section through the contact surface 40 plus the surface of end faces 39 of guide ribs 34 and transverse ribs 33 that are positioned between the intake openings 30 and have a width b of less than 10 mm. Intake openings 30d that are separated from further intake openings 30a by end faces 39 with a width c of more than 10 mm are added to the intake surface F; however, the corresponding end faces 39 of width c of more than 10 mm are not taken into account.

In the embodiment, a first partial surface $F_1$ is provided which comprises a plurality of intake openings 30a, 30b, and 30c and of end faces 39; it is indicated in FIG. 8 with dashed lines. Two intake openings 30d are provided which are separated from the first partial surface F1 by end faces 39 whose width c is greater than 10 mm. The intake openings 30d comprise partial surfaces $F_2$ and $F_3$. The intake surface F is a surface area that is the sum of the partial surfaces F1, F2, and F3. The contact surface 40 identifies the location, i.e., the surface, in which the intake surface F is positioned.

The intake surface F amounts to at least 50% of the surface of the bottom side 36 of the bottom plate 5. In this context, the surface of the bottom side 36 of the bottom plate 5 is the surface that the bottom part 38 occupies in a view in y direction as illustrated in FIG. 8. Advantageously, the intake surface F amounts to 70% to 100% of the surface of the bottom side 36 of the bottom plate 5. The ratio of the intake surface F to the sum of the cross section surfaces of all passages, in the embodiment relative to the cross section surface of the main passage 25, advantageously amounts to from 1 to 5. In the embodiment, the ratio is significantly greater than 1 and advantageously can amount to from 3 to 5.

The cross section of the main passage 25 advantageously amounts to 20% to 50% of the surface of the bottom side 36 of the bottom plate 5. The cross section of the passage is measured in this context at the narrowest location of the passage. The cross section of the main passage 25 is thus at most half the size of the surface of the bottom side 36 of the bottom plate 5. The cross section of the main passage 25 advantageously amounts to 25% to 40% of the surface of the bottom side 36 of the bottom plate 5. In the embodiment, the cross section of the main passage 25 is 25% to 30% of the surface of the bottom side 36 of the bottom plate 5. In the embodiment, the cross section of the main passage 25 is approximately constant. A non-uniform cross section of the main passage 25 whose cross section surface changes in flow direction can be advantageous.

The cross section of the main passage 25 is in this context the cross section of the passage in the bottom plate 5. The effective flow cross section can be reduced in particular by a blower spiral 9 which is projecting into the main passage 25. The effective flow cross section of the main passage 25 advantageously amounts to 10% to 20%, in particular 10% to 15%, of the surface of the bottom side 36 of the bottom plate 5.

As shown in FIG. 9, the guide ribs 34 extend in the direction toward the main passage 25. Between the guide ribs 34, channels 41 are formed through which the air is guided from the intake chamber 58 (FIG. 4) to the main passage 25. In the embodiment, the transverse webs 33 extend approximately in an arc shape. The guide ribs 34 extend in the direction toward the main passage 25 (FIG. 4) in a radial arrangement and in a plane which is defined by the z direction and the x direction. Some of the guide ribs 34 end already before they reach the main passage 25. The channels 41 extending on both sides of these guide ribs 34 are combined and open into a common mouth 42 (FIG. 5) at the main passage 25. The transverse ribs 33 have a significantly reduced height in comparison to the guide ribs 34. The guide ribs 34 guide the flow to the main passage 25. The transverse ribs 33 stabilize the guide ribs 34. The transverse ribs 33 project into the channels 41 which are formed by the guide ribs 34. In order to impair the flow in the channels 41 only minimally, the transverse ribs 33 have a significantly reduced height in comparison to the longitudinal ribs 34. It can also be advantageous to form the bottom plate 5 without transverse ribs 33. A corresponding configuration is shown in the embodiment according to FIG. 12 which will be explained in the following in more detail.

The end faces 39 of the transverse ribs 33 and of the guide ribs 34 are positioned in a common plane (FIGS. 4 and 8) and from the contact surface 40. It can however also be expedient that the end faces 39 of the longitudinal ribs 34 and of the transverse ribs 33 are positioned in different planes wherein at least some of these planes are positioned below a bottom edge of the circumferential wall of a passage, in particular of the circumferential wall 45 of the main passage 25. In this context, the height can vary within a longitudinal rib 34 or a transverse rib 33. The height of the transverse ribs 33 and the height of the longitudinal ribs 34 can be different. However, also the longitudinal ribs 34 can also have different heights. It can be advantageous also that the transverse ribs 33 have different heights. The height is advantageously selected in adaptation to the desired shape and position of the contact surface 40.

Figure 10:
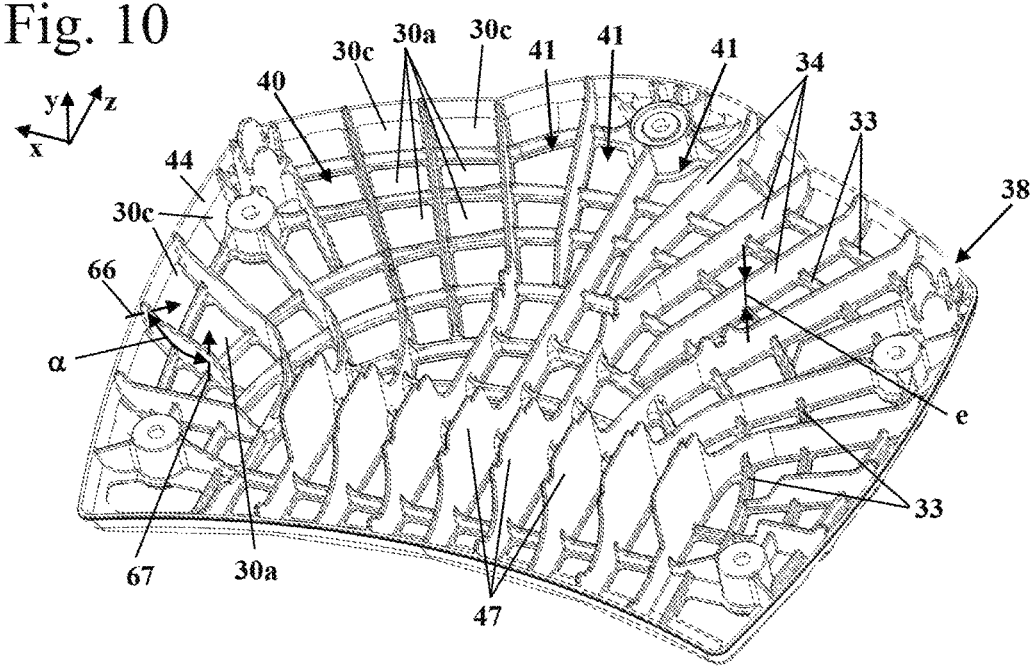
FIG. 10 is another perspective illustration of the bottom part of the bottom plate showing the side which is facing the drive motor.

As shown in FIGS. 9 and 10, some of the guide ribs 34 have projections 47. The projections 47 project into the main passage 25, as shown in FIG. 4. On some of the projections 47 a recess 48 for receiving the circumferential wall 45 is provided. FIG. 9 shows in an exemplary fashion the length l of a channel 41 from the circumferential wall 44 to a mouth 42 where the channel 41 opens into the main passage 25 (FIG. 3).

As shown in FIG. 10, the longitudinal sides of the channels 41 extend advantageously all the way to the circumferential wall 44 of the bottom plate 5 and to the intake openings 30c. Advantageously, intake openings 30a, 30b, 30c, 30d into which the working air flows from different directions open advantageously into at least one channel 41. The sucked-in air flows into the intake openings 30c in a flow direction that has a component in the x direction and/or in the z direction. The inflow directions through the intake openings 30 that open into a channel 41 are advantageously angularly positioned relative to each other so that the channel 41 is supplied with air from different directions. In FIG. 10, in an exemplary fashion the flow direction 66 through an intake opening 30c is illustrated which is substantially extending in x direction and y direction but also may have directional components in z direction. Through an intake opening 30a that opens into the same channel 41, the sucked-in air flows in a flow direction 67. The flow directions 66 and 67 are positioned at an angle a relative to each other. Advantageously, the angle a is between 30° and 90°, in particular between 45° and 80°. The channels 41 have a depth e measured in the parking position 32 (FIG. 1) that is advantageously at least 5 mm, in particular at least 10 mm.

Figure 11:
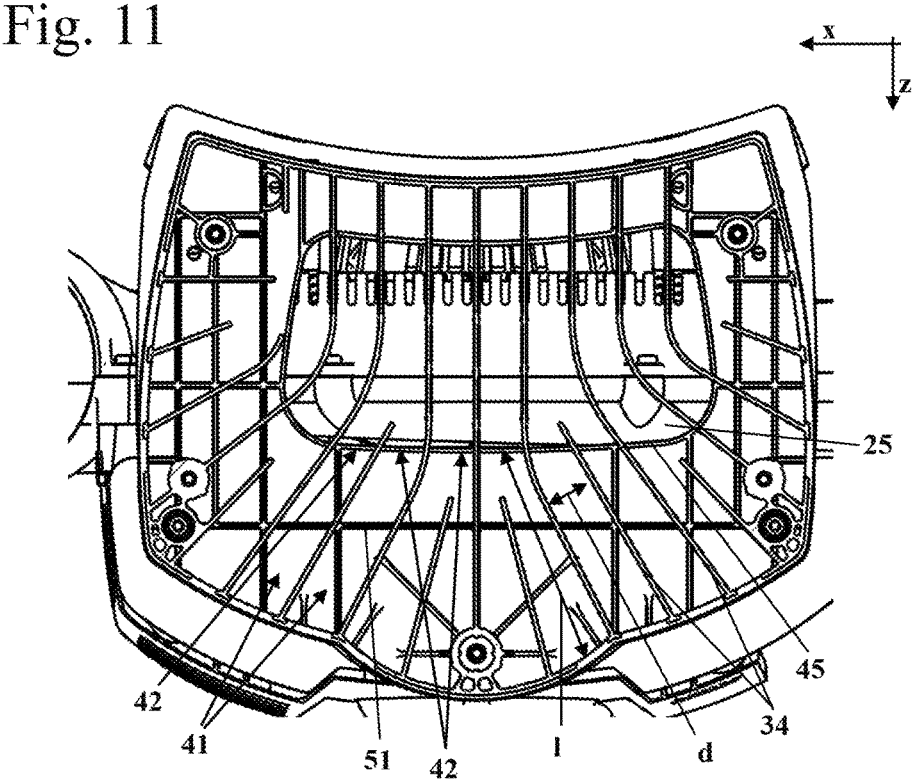
FIG. 11 is a detail section illustration along the section line XI-XI in FIG. 4.

In the section illustration of FIG. 11, the channels 41 and the mouths 42 of the channels 41 are illustrated in detail. As also shown in FIG. 11, the reinforcement ribs 51 of the top part 37 are positioned transversely to the channels 41. The area which is positioned in the plane of the reinforcement ribs 51 therefore forms no part of the channels 41. Advantageously, the length l of at least one channel 41 amounts to at least 5 cm, in particular at least 8 cm. Advantageously, more than half of the channels 41 have a length l of at least 5 cm, in particular at least 8 cm.

The channel 41 comprises advantageously a width d of at least 10 mm, in particular at least 20 mm. The length l of the channel 41 is advantageously selected such that the longitudinal side of the channel 41 that is open at least partially toward the bottom side 36 and comprises the intake openings 30 cannot be covered completely by a single leaf. In this way, a complete closure of the channel 41 by a leaf is prevented. At the same time, it is ensured that no excessively great vacuum force can be generated on a single leaf because working air can still be sucked in laterally to the leaf. In this way, a leaf which is aspirated against the contact surface 40 can fall off the contact surface 40 again, in particular when the power output of the internal combustion engine is reduced, for example, by letting go of the throttle trigger.

The depth e and the width d of the channel 41 are selected such that closure of the channels 41 by a leaf is not possible. Advantageously, depth e and width d are designed such that no leaf can be pulled into the channel 41 and thereby close off the channel 41. It can also be advantageous to select the width d of the channels 41 to be greater so that a leaf can bend into the channel 41 but the leaf cannot completely close off the channel 41.

The flow cross section of the mouths 42 is significantly smaller than the sum of the flow cross sections of the intake openings 30 that open into the respective channel 41. The flow cross section of the mouth 42 advantageously amounts to at most 50% of the surface of the intake openings 30 arranged at this channel 41. Preferably, the flow cross section of the mouth 42 amounts to at most 40% in particular at most 30%, of the surface of the intake openings 30 arranged at this channel 41.

In the embodiment according to FIGS. 1 to 11, the contact surface 40 in the parking position 32 is immediately adjacent to the support surface 31. A minimal spacing between contact surface 40 and support surface 31 can be achieved by legs which are arranged on the contact surface 40. The spacing between the contact surface 40 and the support surface 31 is advantageously less than 20 mm, in particular less than 10 mm.

FIGS. 12 to 18 show a further embodiment of a blower apparatus 1. In this context, same reference characters characterize in all embodiments elements that correspond with each other. The blower apparatus 1 illustrated in FIG. 12 has a backpack frame 3 in which the back plate 4 and the bottom plate 5 are embodied as a single part. The bottom plate 5 comprises a circumferential wall 44 as well as a main passage 25. The main passage 25 in the embodiment is arranged in a central area, i.e., centrally but not centered, but instead off-center. In the bottom plate 5, a plurality of auxiliary passages 55 are provided. In the embodiment, the auxiliary passages 55 are arranged around the main passage 25. The bottom plate 5 comprises a plurality of guide ribs 34 which extend in a radial arrangement in x-z plane in the direction toward the main passage 25. Transverse ribs 33 which extend from the top side 35 into the intake chamber 58 are not provided.

In case of a neighboring arrangement of a plurality of auxiliary passages 55 at a common channel 41, transverse webs 60 are formed in the embodiment. The transverse webs 60 do not extend from the wall that forms the top side 35 into the intake chamber 58 which extends between the contact surface 40 and this wall. The transverse webs 60 are therefore not considered as transverse ribs 33 in this configuration.

Due to the one-part configuration of the guide ribs 34 with the top side 35 of the bottom plate 5 (FIG. 14), transverse ribs 33 are not required. With the exception of the area of the main passage 25, exclusively end faces 39 of guide ribs 34 are positioned in the contact surface 40. In the main passage 25, additional ribs 63 are provided whose end faces form a contact surface for leaves. In the embodiment, the ribs 63 are formed on a grate 77 that is formed as a separate component and is inserted into the main passage 25. A one-part embodiment of the ribs 63 together with the circumferential wall 45 of the main passage 25 can be advantageous also. A grate 57 with guide ribs 34 and transverse ribs 33 which extends across the entire bottom side 36, as in the embodiment according to FIGS. 1 to 11, is not provided.

Figure 12:
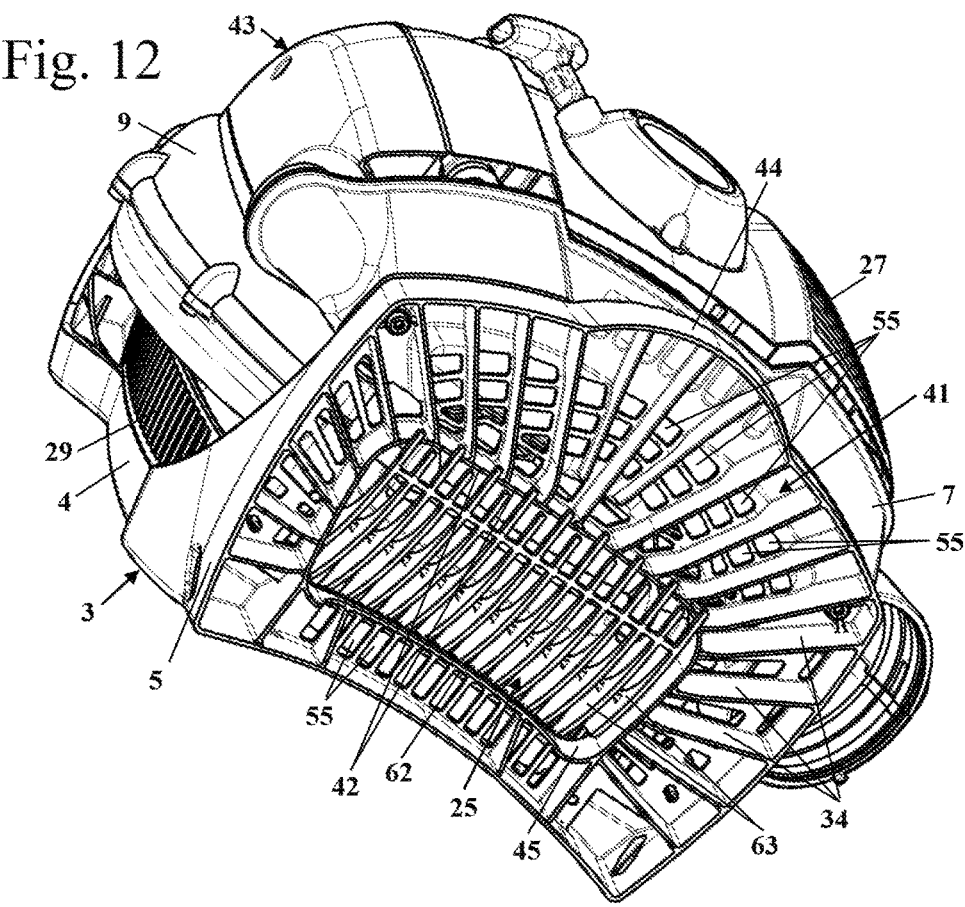
FIG. 12 is a perspective illustration of an embodiment of the blower apparatus.
Figure 13:
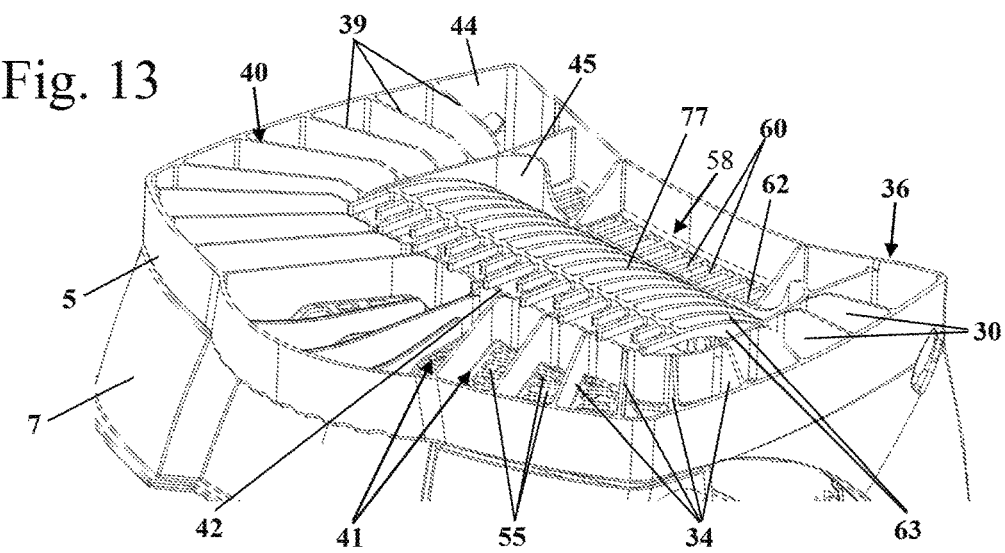
FIG. 13 is a perspective detail illustration of the area of the bottom plate of the blower apparatus of FIG. 12.

The channels 41 formed between the ribs 34 open at mouths 42 (FIG. 13) between the ribs 63 and open through the auxiliary passages 55 at the top side 35 (FIG. 14) of the bottom plate 5. The main passage 25 comprises a circumferential wall 45 that has a cutout 62 in an area adjacent to the back plate 4. In this area, the circumferential wall 45 has only a very minimal height. This is also shown in FIG. 13. As also shown in FIGS. 12 and 13, the circumferential wall 44 has approximately a constant height. The intake openings 30 are formed by the longitudinal side of the channels 41 that is open toward the bottom side 36. It can also be provided that the circumferential wall 44 has intake openings that open into the channels 41.

In the embodiment according to FIGS. 12 to 19, the contact surface 40 does not extend planar but follows the course of the end faces 39 of the ribs 34 and 63. The contact surface 40 comprises therefore an irregular contour. The contact surface 40 is formed respectively by the shortest connection of the end faces 39 of neighboring ribs 34, 63. In this embodiment, the end faces 39 of the ribs are positioned also below a bottom edge of a correlated passage 25, 55. In this way, aspirated leaves or the like are already contacting the end faces 39 of the ribs 33, 34 and cannot close off the passage 25, 55. Advantageously, a plurality of intake openings 30 are correlated with one passage 25, 55. The sum of the surface areas of the intake openings 30 is advantageously greater than the sum of the cross section surfaces of the passages 25, 55.

Figure 14:
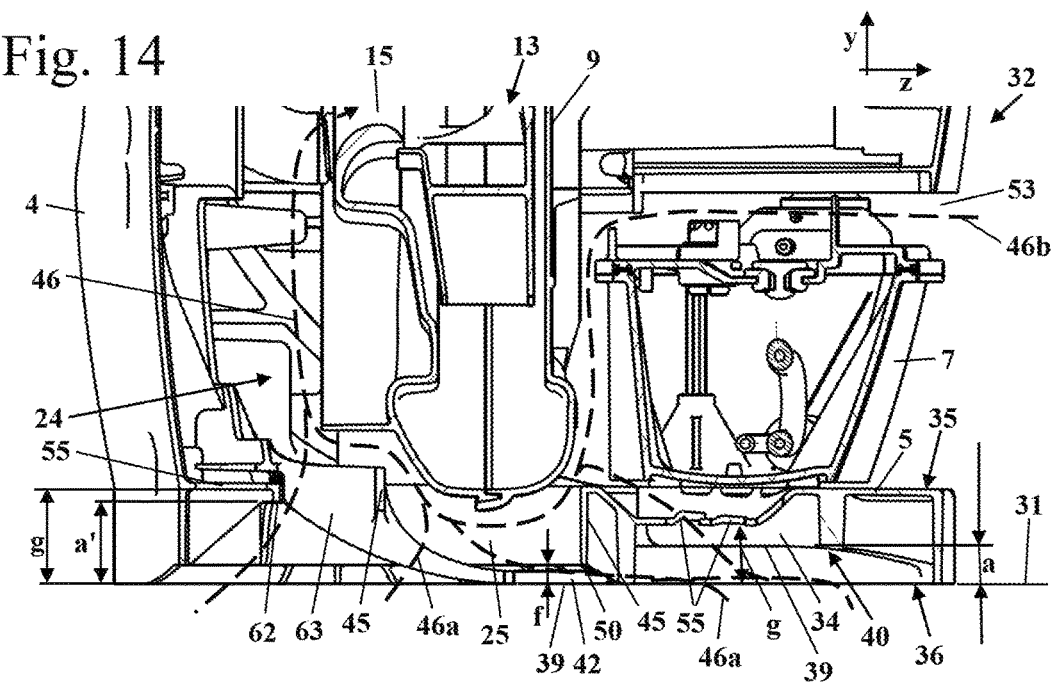
FIG. 14 is a detail section illustration of the area of the bottom plate of the blower of FIGS. 12 and 13.

In this embodiment, an air flow is also sucked into the inlet 15 of the blower 13, as illustrated by arrow 46 in FIG. 14. In this context, a partial air flow 46a is sucked from the bottom side 36 of the bottom plate 5 and a further, advantageously smaller, partial air flow 46b is sucked in through the gaps 53 and 54. The partial air flow 46a can be sucked in from various areas of the bottom plate 5 and can take different flow paths through the bottom plate 5. This depends on the flow resistances and depends also on which area is covered by aspirated leaves. In FIG. 14, different flow paths for the partial air flow 46a, which may be comprised of a plurality of partial flows, are shown in an exemplary fashion.

As also shown in FIG. 14, the air flows from channels 41 through the mouths 42 at the bottom side 36 into the main passage 25 or through auxiliary passages 55 in the area below the operating medium tank 7 and from there passes below the blower spiral 9 and through the main passage 25 into the intermediate space 24. In case of further auxiliary passages 55, which are arranged in the area of the back plate 4, the sucked-in air flows directly into the intermediate space 24.

As also shown in FIG. 14, the bottom plate 5 is a downwardly open profile with ribs provided with a top side 35 that is closed with the exception of the passages 25, 55 and a downwardly open bottom side 36 with ribs. The passages 25, 55 are formed by cutouts in the bottom plate 5. The intake openings 30 are defined between the end faces 39 of the ribs 34 and 63. The end faces 39 of the ribs 34, 63 and thus also the contact surface 40 have a spacing a relative to the support surface 31 and this spacing a is measured perpendicular to the support surface 31. The spacing a advantageously amounts to less than 20 mm, in particular less than 10 mm. A spacing of 0 can be advantageous also. At the cutout 62, a greater spacing a' may result.

The circumferential wall 45 of the main passage 25 has a bottom edge 50 which has a spacing f relative to the support surface 31 and this spacing f is measured perpendicular to the support surface 31. The intake openings 30, which are formed in the area of the main passage 25 between the ribs 63, have in the area where the spacing f is measured in FIG. 14 no spacing relative to the support surface 31 but are positioned instead in the support surface 31. In the area of the cutout 62, the spacing is enlarged to the spacing a'.

The auxiliary passages 55 have relative to the support surface 31 a spacing g that is also measured perpendicularly to the support surface 31. In this context, different spacings g at different auxiliary passages 55 may result. The spacing f at the main passage 25 is in particular less than the spacing g at at least one auxiliary passage 55. The spacings f, g at the passage advantageously amounts to at least twice the spacing a, a' of a correlated intake opening 30. A correlated intake opening 30 is in this context an intake opening 30 which is connected with the passage 25, 55 by means of a flow connection that is positioned above the contact surface 40.

Correlated spacings a or a' and f or g are measured closest to each other and perpendicular to the support surface 31. The circumferential wall 45 of the main passage 25 has the spacing a' at the cutout 62 relative to the support surface 31. The spacing a' is greater than the spacing g of the auxiliary openings 55 at the opposite side of the main passage 25. The spacing a' is however smaller than the spacing g of the correlated auxiliary passage 55 arranged between main passage 25 and back plate 4. Since the spacing f, g of a passage 25, 55 is greater than the spacing a, a' of a correlated intake opening 30 relative to the support surface 31, air can flow from the intake opening 30 through a flow connection formed above the contact surface 40 to the correlated passage 25, 55.

Figure 15:
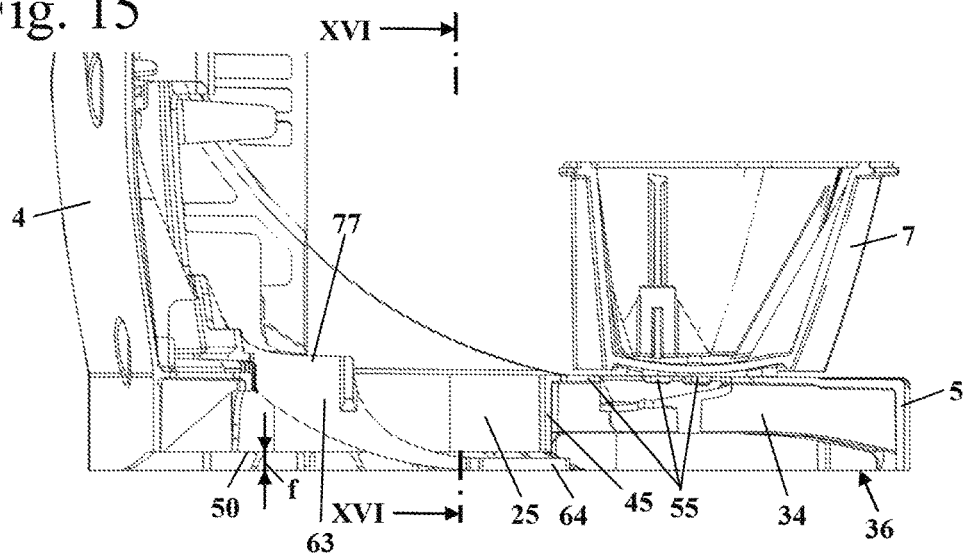
FIG. 15 is a schematic detail section illustration of a backpack frame and fuel tank of the blower apparatus of FIGS. 12 to 14.
Figure 16:
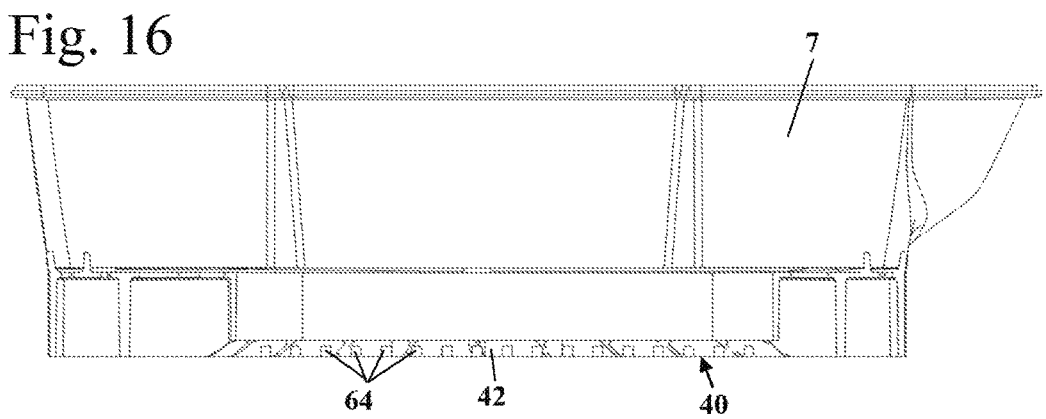
FIG. 16 is a schematic section illustration along the section line XVI-XVI of FIG. 15.

FIGS. 15 and 16 show the configuration of the ribs 63 in the main passage 25 in detail. The ribs 63 have a curved configuration. The ribs 63 have a free end section 64 which projects to a position below the circumferential wall 45 of the main passage 25. The mouths 42 of the channels 41 are formed between the end section 64 of the ribs 63. This is also shown in FIG. 16. FIG. 16 shows also the contact surface 40 which is formed on the ribs 63.

Figure 17:
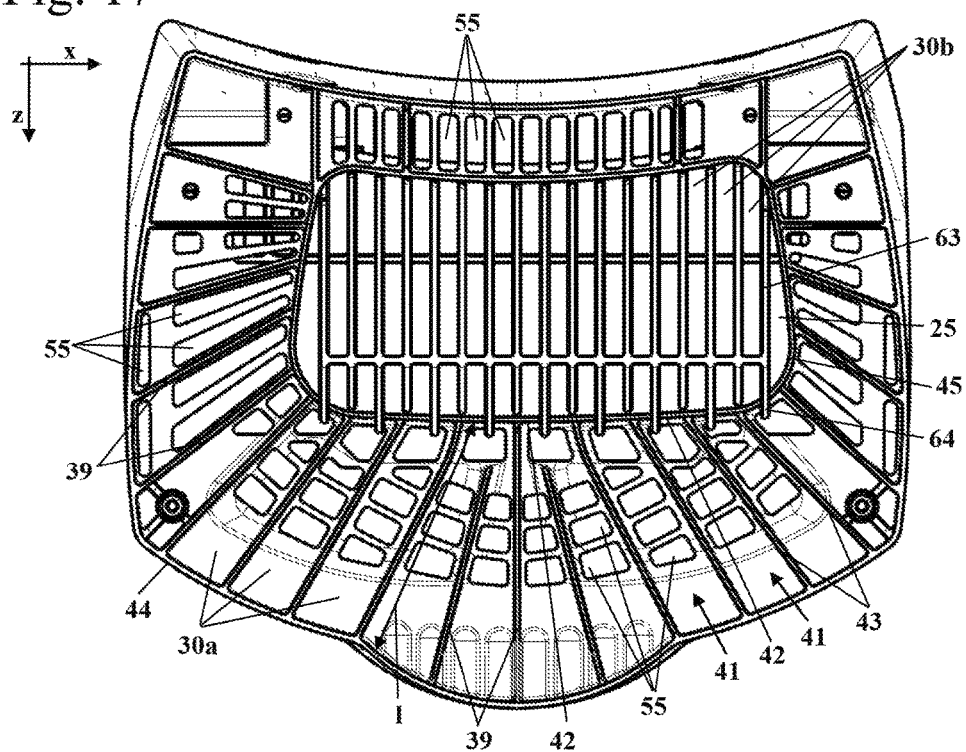
FIG. 17 is a view of the bottom plate of the blower apparatus from below.

As shown in FIG. 17, between the ribs 63 in the main passage 25 intake openings 30b are formed which are overlapping the main passage 25 in a viewing direction parallel to the y axis. Between the guide ribs 34, intake openings 30a are formed which are positioned outside of the main passage 25. The intake openings 30a each form a longitudinal side of a channel 41. The channels 41 have advantageously a length l that amounts to at least 5 cm, advantageously at least 8 cm. The depth and width of the channels 41 corresponds advantageously to the dimensions disclosed in connection with the preceding embodiment.

As shown in FIG. 17, the intake openings 30a and 30b extend across most of the surface of the bottom side 36 of the bottom plate 5. The sum of the surface areas of all intake openings 30 plus the end faces 39 of ribs whose width is less than 10 mm form an intake surface F that amounts to at least 50% of the surface of the bottom side 36 of the bottom plate 5. The intake surface F advantageously amounts to 70% to 100% of the surface of the bottom side 36 of the bottom plate 5. In the embodiment, the intake surface F corresponds to the entire surface of the bottom side 36 minus the circumferential wall 44.

It can also be provided that the intake surface F is greater than the surface of the bottom side 36. Advantageous is an intake surface F of 70% to 120% of the surface of the bottom side 36 of the bottom plate 5. The surface of the bottom side 36 of the bottom plate 5 is measured in a view perpendicular to the support surface 31 in the parking position 32. The surface of the bottom side 36 refers to the surface area of the projection of the bottom side 36 onto the flat support surface 31. The actual surface area of the bottom side 36 can be determined only with difficulty due to the irregular course of the bottom side 36 that results from the ribs 33, 34 and the slants and curvatures.

The contact surface 40 can be curved so that some of the intake openings 30 at least partially are extending transversely to the support surface 31, in particular in the circumferential wall 44 of the bottom plate 5. The actual intake surface F can therefore have a greater surface area than the surface of the bottom side 36 of the bottom plate 5. An intake surface F that amounts to more than 100% of the surface of the bottom side 36 of the bottom plate 5 results in particular when intake openings 30 at least partially are positioned in the circumferential wall 44 of the bottom plate 5.

In the embodiment, the intake surface F is interrupted only by the end faces 39 of the ribs 34 and 63. The sum of the cross section surfaces of all passages, i.e., the main passage 25 and all auxiliary passages 55, advantageously amounts to 20% to 50% of the surface of the bottom side 36 of the bottom plate 5. The main passage 25 is the passage with the greatest cross section surface. Through the main passage 25 the greatest proportion of working air is sucked from the bottom side 36 to the top side of the bottom plate 5. The main passage 25 in the embodiment is the passage into which the blower spiral 9 is projecting. Through each one of the auxiliary passages 55, a reduced proportion of working air is sucked in. The intake surface F in the embodiment is at least twice as large as the cross section of the main passage 25. The ratio of the intake surface F to the sum of the cross section surfaces of all passages 25, 55 advantageously amounts to from 1 to 5. The flow cross section of one, in particular each one, of the mouths 42 advantageously amounts to at most 50% of the surface of the intake openings 30 arranged at this channel 41.

In the embodiment according to FIGS. 12 to 19, the channels 41 are open via the side which is facing the bottom side 36 so that the entire longitudinal side of the channel 41 forms the intake opening 30. It can also be advantageous that at least one intake opening 30c is formed at the circumferential wall 44 of the bottom plate 5. The flow cross section of the mouths 42 advantageously amounts to less than 30% of the surface of the intake opening 30 formed at the respective channel 41. Advantageously, at least one mouth of the channel is formed by an auxiliary passage.

Figure 18:
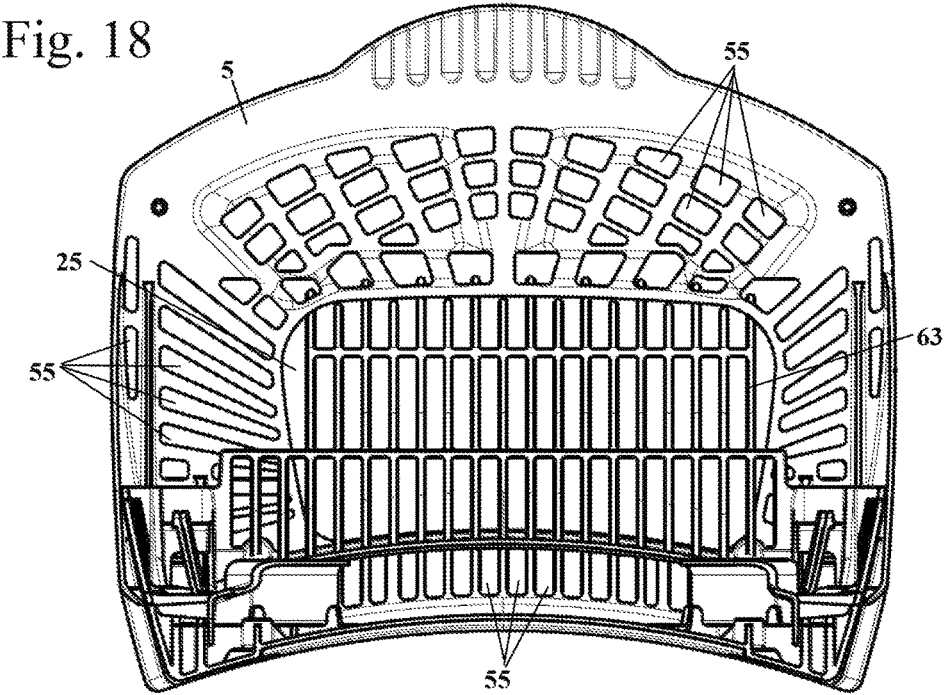
FIG. 18 is a view of the bottom plate of the blower apparatus from above.
Figure 19:
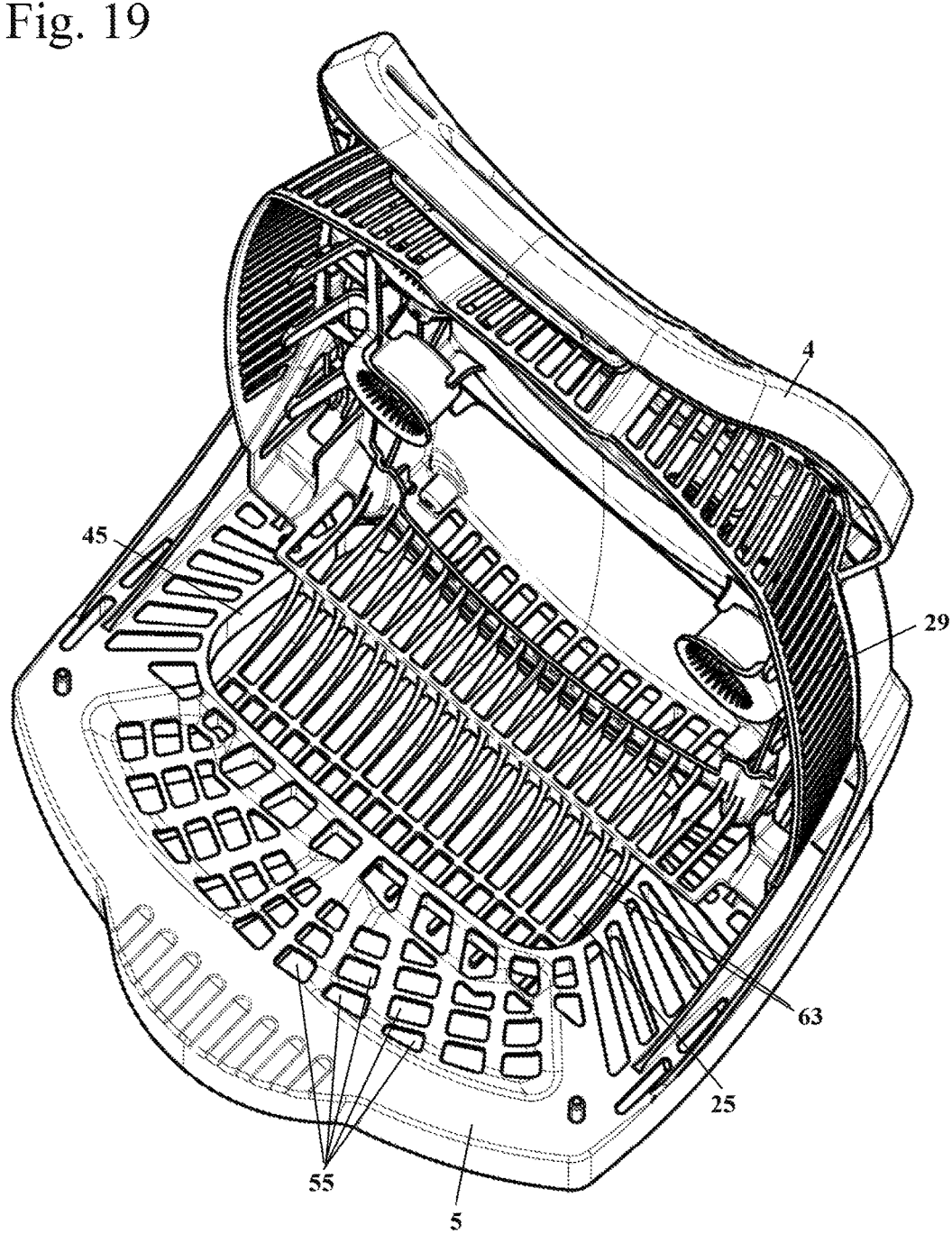
FIG. 19 is a perspective illustration of the backpack frame of the blower apparatus.

FIG. 18 shows the auxiliary passages 55. A plurality of auxiliary passages 55 are arranged in the area of the bottom plate 5 above which the operating medium tank 7 (FIG. 15)

is positioned. The arrangement of the auxiliary passages 55 and the main passage 25 is also illustrated in FIG. 19.

The illustrated embodiments, in any combination of their features, can form further advantageous embodiments. The arrangement and the type of blower spiral, drive motor, operating medium tank, and further components can be modified by a person of skill in the art without being limited to the disclosed embodiments. In particular, an arrangement with blower spiral attached to the bottom plate in a horizontal position can be expedient.

The specification incorporates by reference the entire disclosure of German priority document 10 2016 005 099.3 having a filing date of Apr. 27, 2016.

While specific embodiments of the invention have been shown and described in detail to illustrate the inventive principles, it will be understood that the invention may be embodied otherwise without departing from such principles.

What is claimed is:

1. A backpack power tool comprising:
   a backpack frame;
   a drive motor mounted on the backpack frame;
   a blower mounted on the backpack frame and operatively connected to the drive motor, the blower configured to convey working air when driven by the drive motor;
   the backpack frame comprising a back plate and a bottom plate;
   the bottom plate having a top side facing the blower and the drive motor;
   the bottom plate having a bottom side facing away from the blower and the drive motor;
   the bottom plate comprising one or more passages through which the working air is sucked in by the blower from the bottom side through the bottom plate to the top side of the bottom plate;
   the bottom plate comprising ribs provided on the bottom side of the bottom plate, wherein the ribs comprise end faces facing away from the top side and forming a contact surface for leaves aspirated in operation of the power tool against the bottom plate;
   the bottom plate comprising one or more intake openings arranged on the bottom side of the bottom plate;
   the intake openings positioned between the end faces of the ribs in the contact surface and connected to the one or more passages by at least one flow connection, positioned on a side of the contact surface facing the blower, wherein the working air is sucked in by the blower from the environment through the intake openings and the one or more passages;
   the bottom plate comprising an intake surface that is the sum of the surfaces of all of the intake openings and of all of the end faces of the ribs positioned between the intake openings and having a width of less than 10 mm;
   the intake surface amounts to at least 50% of the surface of the bottom side of the bottom plate.

2. The power tool according to claim 1, wherein the intake surface amounts to 70% to 120% of the surface of the bottom side of the bottom plate.

3. The power tool according to claim 1, wherein the sum of cross section areas of all of the passages amounts to 20% to 80% of the surface of the bottom side of the bottom plate.

4. The power tool according to claim 1, wherein the one or more passages include a main passage through which the greatest proportion of the working air is sucked in from the bottom side to the top side of the bottom plate.

5. The power tool according to claim 4, wherein the intake surface of the bottom plate is at least twice as large as a minimum cross section of the main passage.

6. The power tool according to claim 4, wherein the blower comprises a blower spiral projecting into the main passage.

7. The power tool according to claim 4, wherein the blower comprises an inlet facing the back plate, wherein between the back plate and the inlet an intermediate space is formed, and wherein the working air sucked in through the main passage flows from the main passage immediately into the intermediate space between the back plate and the inlet.

8. The power tool according to claim 4, wherein the bottom plate comprises one or more channels formed on the bottom side of the bottom plate, wherein the one or more channels are delimited at least partially by the ribs, wherein the one or more channels each have a side facing away from the top side of the bottom plate, wherein at least one of the intake openings is arranged at said side facing away from the top side of the bottom plate.

9. The power tool according to claim 8, wherein the one or more channels extend in a direction toward the main passage.

10. The power tool according to claim 8, wherein a length of said side of the one or more channels facing away from the top side of the bottom plate amounts to at least 5 cm.

11. The power tool according to claim 8, wherein the one or more channels comprise at least one mouth connecting the one or more channels to the main passage, wherein a flow cross section of the at least one mouth amounts to at most 50% of the surface of the at least one intake opening arranged at said side facing away from the top side of the bottom plate.

12. The power tool according to claim 11, wherein the at least one mouth is arranged in a circumferential wall of the main passage.

13. The power tool according to claim 11, wherein the at least one mouth is arranged on the top side of the bottom plate and is fluidically connected to the main passage on the top side of the bottom plate.

14. The power tool according to claim 1, wherein the power tool has a parking position in which the power tool is parked on a planar horizontal support surface.

15. The power tool according to claim 14, wherein in the parking position, viewed in a perpendicular projection onto the support surface, at least one of the intake openings is positioned outside of the one or more passages.

16. The power tool according to claim 1, wherein the drive motor is an internal combustion engine and wherein a portion of the working air sucked in through the intake surface is branched off as cooling air for cooling the internal combustion engine.

17. The power tool according to claim 16, further comprising an operating medium tank which in the parking position is arranged above the bottom plate and is arranged on a side of the blower facing away from the back plate.

18. The power tool according to claim 17, wherein the one or more passages include an auxiliary passage arranged in the parking position in an area below the operating medium tank.

19. The power tool according to claim 18, further comprising a motor housing positioned in the parking position above the operating medium tank, wherein the drive motor is arranged in the motor housing, wherein between the motor housing and the operating medium tank at least one gap is formed for taking in the working air.

20. The power tool according to claim 1, wherein the bottom plate comprises a circumferential wall and wherein at least one of the intake openings adjoins the circumferential wall.

21. The power tool according to claim 1, further comprising at least one upper opening for taking in the working air, wherein the at least one upper opening is arranged in an area between the blower and the back plate and opens into an intermediate space formed between the blower and the back plate.

* * * * *